(12) United States Patent
Porwal

(10) Patent No.: US 9,043,707 B2
(45) Date of Patent: May 26, 2015

(54) CONFIGURABLE VIEWCUBE CONTROLLER

(71) Applicant: Autodesk, Inc., San Rafael, CA (US)

(72) Inventor: Gunjan Porwal, Clementi (SG)

(73) Assignee: Autodesk, Inc., San Rafael, CA (US)

( * ) Notice: Subject to any disclaimer, the term of this patent is extended or adjusted under 35 U.S.C. 154(b) by 128 days.

(21) Appl. No.: 13/910,808

(22) Filed: Jun. 5, 2013

(65) Prior Publication Data

US 2013/0332889 A1    Dec. 12, 2013

Related U.S. Application Data

(60) Provisional application No. 61/658,294, filed on Jun. 11, 2012.

(51) Int. Cl.
| | |
|---|---|
| *G06F 3/048* | (2013.01) |
| *G06T 19/20* | (2011.01) |
| *G06F 3/0481* | (2013.01) |
| *G06T 15/20* | (2011.01) |

(52) U.S. Cl.
CPC ............ *G06F 3/04815* (2013.01); *G06T 15/20* (2013.01); *G06T 19/20* (2013.01); *G06T 2219/2012* (2013.01); *G06T 2219/2016* (2013.01)

(58) Field of Classification Search
CPC .......... G06F 3/04815; G06F 17/30873; G06F 3/0482
See application file for complete search history.

(56) References Cited

U.S. PATENT DOCUMENTS

| | | | |
|---|---|---|---|
| 5,734,805 A | 3/1998 | Isensee et al. | |
| 6,907,579 B2* | 6/2005 | Chang | 715/850 |
| 7,782,319 B2* | 8/2010 | Ghosh et al. | 345/427 |
| 7,814,436 B2* | 10/2010 | Schrag et al. | 715/851 |
| 8,302,027 B2* | 10/2012 | Chiu et al. | 715/789 |
| 8,502,817 B2* | 8/2013 | Deb et al. | 345/419 |
| 8,665,272 B2* | 3/2014 | Fitzmaurice et al. | 345/427 |
| 2004/0233239 A1* | 11/2004 | Lahdesmaki | 345/810 |
| 2005/0028111 A1 | 2/2005 | Schrag et al. | |
| 2013/0332889 A1* | 12/2013 | Porwal | 715/850 |
| 2014/0015831 A1* | 1/2014 | Kim et al. | 345/419 |
| 2014/0129990 A1* | 5/2014 | Xin et al. | 715/849 |

OTHER PUBLICATIONS

Balakrishnan, R. et al., "Exploring bimanual camera control and object manipulation in 3D graphics interfaces," In Proc. of ACM CHI, pp. 56-63 (1999).
Bares, W. et al., "Generating Virtual Camera Compositions," In Proceedings of ACM IUI'01, pp. 9-12 (2001).

(Continued)

*Primary Examiner* — David Phantana Angkool
(74) *Attorney, Agent, or Firm* — Gates & Cooper LLP

(57) ABSTRACT

A method, apparatus, system, and computer program product provide the ability to display representative properties of a three-dimensional scene view. A 3D scene and a 3D representation of a coordinate system of the 3D scene are displayed. Different faces of the 3D representation represent and correspond to different viewpoints of the 3D scene. Different statistics for features of the 3D scene are reflected on the different faces of the 3D representation based on the viewpoint corresponding to each face. Manipulation of the 3D representation identifies and selects a different viewpoint of the 3D scene which is then reoriented accordingly.

20 Claims, 5 Drawing Sheets

(56) References Cited

OTHER PUBLICATIONS

Bares, W. et al., "Intelligent Multi-Shot Visualization Interfaces for Dynamic 3D Worlds," Proceedings of ACM IUI '99, pp. 119-126 (1999).
Baudisch, P., et al., "Snap-and-go: helping users align objects without the modality of traditional snapping," In ACM Proceedings of the SIGCHI Conference on Human Factors in Computing Systems, CHI '05, pp. 301-310 (2005).
Bier, E. A., "Snap-dragging in three dimensions," In ACM Proceedings of the 1990 Symposium on interactive 3D Graphics, pp. 193-204 (1990).
Bowman, D., et al., "Testbed environment of virtual environment interaction," In Proceedings of ACM VRST. pp. 26-33 (1999).
Bowman, D., et al., "Travel in immersive virtual environments," IEEE VRAIS'97 Virtual Reality Annual International Symposium. pp. 45-52 (1997).
Burtnyk, N., et al., "StyleCam: Interactive Stylized 3D Navigation using integrated Spatial and Temporal Controls," In Proceedings of ACM UIST 2002, pp. 101-110 (2002).
Burtnyk, N. et al., "ShowMotion: camera motion based 3D design review," In Proceedings of the 2006 Symposium on interactive 3D Graphics and Games, SI3D '06, pp. 167-174 (2006).
Chapuis, O. et al., "Metisse is not a 3D desktop!," In Proceedings of the 18th Annual ACM Symposium on User interface Software and Technology, UIST '05, pp. 13-22 (2005).
Chittaro, L. et al., "3D location-pointing as a navigation aid in Virtual Environments," In ACM Proceedings of the Working Conference on Advanced Visual interfaces (Gallipoli, Italy, May 25-28, 2004). AVI '04, pp. 267-274 (2004).
Christianson, D.B., et al., "Declarative camera control for automatic cinematography," Proceedings of AAAI '96 (Portland, OR), pp. 148-155 (1996).
Drucker, S. et al., "CamDroid: A System for Implementing Intelligent Camera Control," In Proceedings of ACM Symposium on Interactive 3D Graphics, pp. 139-144 (1995).
Galyean, T., "Guided navigation of virtual environments," ACM Symposium on Interactive 3D Graphics. pp. 103-104 (1995).
Gliecher, M., et al., "Through-the-lens camera control," ACM SIGGRAPH 92. pp. 331-340 (1992).
Grossman, T., et al., "Interaction techniques for 3D modeling on large displays," In Proceedings of the 2001 Symposium on interactive 3D Graphics SI3D '01, pp. 17-23 (2001).
Hanson, A. et al., "Constrained 3D navigation with 2D controllers," IEEE Visulization. pp. 175-182 (1997).
He, L., et al., "The virtual cinematographer: a paradigm for automatic real-time camera control and directing," ACM SIGGRAPH 96. pp. 217-224 (1996).
Igarashi, T. et al., "Path drawing for 3D walkthrough," ACM UIST. pp. 173-174 (1998).
Jul, S., et al., "Critical zones in desert fog: aids to multiscale navigation," ACM Symposium on User Interface Software and Technology. pp. 97-106 (1998).
Khan, A. et al., "HoverCam: interactive 3D navigation for proximal object inspection," In Proceedings of ACM Symposium on Interactive 3D graphics and games, pp. 73-80 (2005).
Komerska, R. et al., "Haptic-GeoZui3D: Exploring the Use of Haptics in AUV Path Planning," Proceedings 13th International Symposium on Unmanned Untethered Submersible Technology (UUST'03), Durham, NH (2003).
Mackinlay, J., et al., "Rapid controlled movement through a virtual 3D workspace," ACM SIGGRAPH 90. pp. 171-176 (1990).
Phillips, C.B., et al., "Automatic Viewing Control for 3D Direct Manipulation," In ACM Proceedings of ACM Symposium on Interactive 3D Graphics, pp. 71-74 (1992).
Pierce, J. S., et al., "Toolspaces and glances: storing, accessing, and retrieving objects in 3D desktop applications," In ACM Proceedings of the 1999 Symposium on interactive 3D Graphics, SI3D, pp. 163-168 (1999).
Rezzonico, S. et al., "Browsing 3D Bookmarks in BED," WebNet 1996.
Robertson, G., et al., "The cognitive coprocessor architecture for interactive user interfaces," In Proceedings of ACM UIST 1989, pp. 10-18 (1989).
Singh, K. et al., "Visualizing 3D Scenes using Non-Linear Projections and Data Mining of Previous Camera Moves," In Proceedings of ACM Computer Graphics, Virtual Reality, Visualization and Interaction in Africa, pp. 41-48 (2004).
Smith, G., et al., "3D Scene Manipulation with 2D Devices and Constraints," Proceedings of Graphics Interface, pp. 135-142 (2001).
Steed, A., "Efficient navigation around complex virtual environments," ACM VRST. pp. 173-180 (1997).
Stoakley, R., et al., "Virtual reality on a WIM: Interactive worlds in miniature," ACM CHI. pp. 265-272 (1995).
Stoev, S.L. et al., "A Case Study on Automatic Camera Placement and Motion for Visualizing Historical Data," Proceedings of IEEE Visualization, pp. 545-558 (2002).
Tan, D., et al., "Exploring 3D navigation: combining speed-coupled flying with orbiting," ACM CHI. pp. 418-425 (2001).
Tory, M., Mental Registration of 2D and 3D Visualizations (An Empirical Study). In Proceedings of the 14th IEEE Visualization 2003 (Vis'03) pp. 371-378 (2003).
Tory, M. et al., "Comparing ExoVis, Orientation Icon, and In-Place 3D Visualization Techniques," In Proceedings of Graphics Interface, pp. 57-64 (2003).
Tory, M., et al., "Combining 2D and 3D views for orientation and relative position tasks," In ACM Proceedings of the SIGCHI Conference on Human Factors in Computing Systems, CHI '04, pp. 73-80 (2004).
Wan, M., et al., "Distance-Field Based Skeletons for Virtual Navigation," IEEE Visualization 2001. pp. 239-245 (2001).
Ware, C. et al., "Context sensitive flying interface," ACM Symposium on Interactive 3D Graphics. pp. 127-130 (1997).
Ware, C. et al., "Exploration and virtual camera control in virtual three dimensional environments," ACM Symposium on Interactive 3D Graphics. pp. 175-183 (1990).
Zeleznik, R. et al., "UniCam—2D Gestural Camera Controls for 3D Environments," ACM Symposium on Interactive 3D Graphics. 169-173 (1999).
Zeleznik, R., et al., "Two pointer input for 3D interaction," ACM Symposium on Interactive 3D Graphics. pp. 115-120 (1997).

* cited by examiner

CONFIGURABLE VIEWCUBE CONTROLLER

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/658,294, filed on Jun. 11, 2012, by Gunjan Porwal, entitled "CONFIGURABLE VIEWCUBE CONTROLLER,".

This application is related to the following co-pending and commonly-assigned patent application, which application is incorporated by reference herein:

U.S. patent application Ser. No. 11/729,211 filed on Mar. 28, 2007, now U.S. Pat. No. 7,782,319 issued on Aug. 24, 2010, entitled "THREE-DIMENSIONAL ORIENTATION INDICATOR AND CONTROLLER", by Anirban Ghosh, et. al,.

BACKGROUND OF THE INVENTION

1. Field of the Invention

The present invention relates generally to three-dimensional (3D) graphics applications, and in particular, to a method, apparatus, and article of manufacture for providing access to multiple views using a single orientation/controller widget.

2. Description of the Related Art

When working with three-dimensional (3D) data (i.e., in a graphics application), a number of orientations of the data are needed by the user to provide a better understanding of the shape and size of the geometry being viewed. Accessing a number of views of the data is difficult and involves several user steps with prior art methods. In addition, prior art controllers that are used to view the orientation contain a limited amount of information. What is needed is a method and capability to easily view multiple different orientations as well as information about such a potential orientation. Such problems may be better understood with an explanation of prior art graphics applications and orientation view capabilities.

Typical 3D authoring applications allow users to create, manipulate, and view 3D geometry on two-dimensional displays. By rendering a view of the virtual scene from a particular viewpoint, a 2D image can be shown on the display. While this allows a rich and effective means of simulating the experience of viewing real 3D objects and scenes, controlling the viewpoint and understanding the position of the viewpoint relative to the object is a significant task for the user.

Early primitive 3D graphics applications were command line driven, allowing users to directly enter and query the numerical position, orientation, and other properties of a virtual camera which defined a particular viewpoint. With the advent of graphical user interfaces (GUIs), numerical entry and query were largely replaced by graphical representations of the 3D camera in the scene and direct manipulation of it either while viewing through the camera or while looking at it through another camera. In addition, preset viewpoints commonly used in the drafting and design fields, such as "top view", "side view", etc., could be selected through menus. However, there are many shortcomings to this approach and more advanced scene orientation methods are possible.

One prior art methodology, developed by the assignee of the present application, provides for the use of a "viewcube" (also referred to as "CubeCompass") and is described in U.S. Pat. No. 7,782,319 identified above and incorporated by reference herein. The viewcube is a cube icon representing different viewpoints in a three-dimensional (3D) scene. When the view of the scene is changed by the user, the view cube rotates to show the orientation of the new view. Accordingly, current viewcube controllers provide a convenient way of seeing the camera angle of an existing scene or model in the viewport. The viewcube provides a handy way of knowing whether the scene/model is being viewed from front, back, left, right, top-left, top-right and so on. However, such viewcubes do not provide any additional information for the scene apart from camera angle.

SUMMARY OF THE INVENTION

Embodiments of the invention make use of the viewcube and the ability to display more information to the user by putting certain information directly on the cube that might inform a user about that view before the view is changed. For example, information about lighting, scene complexity, number of vertices or faces might be added directly to the cube face corresponding to that view. Alternatively, some sort of color coding might be used. In this regard, embodiments of the invention provide a new way for viewing statistics for a viewport scene by providing additional information in a viewcube controller.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a new way for viewing statistics for a viewport scene by providing additional information in a viewcube controller.

Hardware Environment

Figure 1:
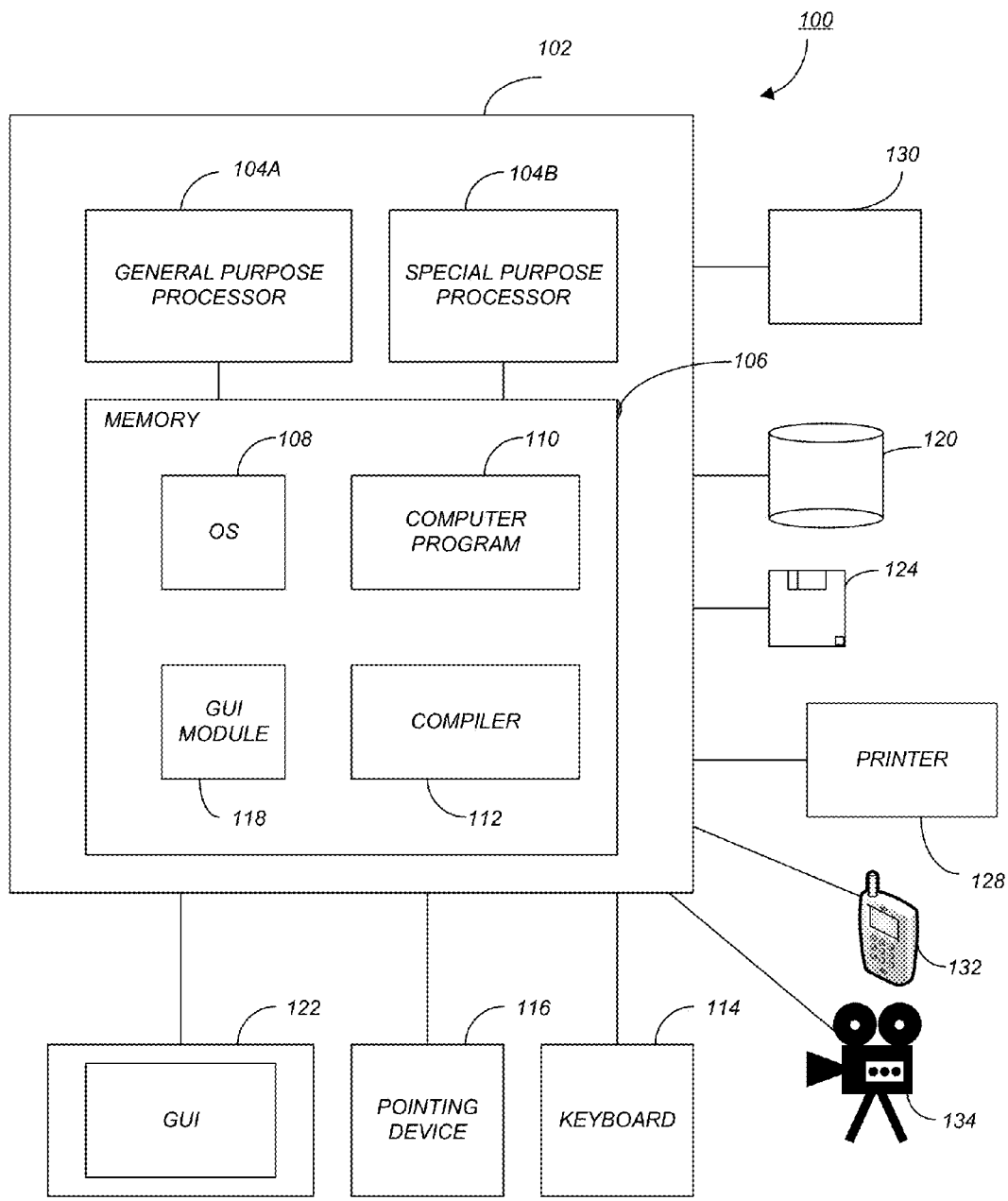
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands.

In various embodiments of the invention, the display 122 is a 3D display device which may comprise a 3D enabled display (e.g., 3D television set or monitor), a head mounted display (e.g., a helmet or glasses with two small LCD or OLED [organic light emitting diode] displays with magnifying lenses, one for each eye), active or passive 3D viewers (e.g., LC shutter glasses, linearly polarized glasses, circularly polarized glasses, etc.), etc. In this regard, any technique that may be utilized to view 3D stereoscopic images is represented by display 122. Further, one or more stereoscopic cameras 134 may be configured to communicate with computer 100 to enable a 3D display on 3D display 122.

The 3D image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, cause the computer 102 to perform the steps necessary to implement and/or use the present invention or to load the program of instructions into a memory 106, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
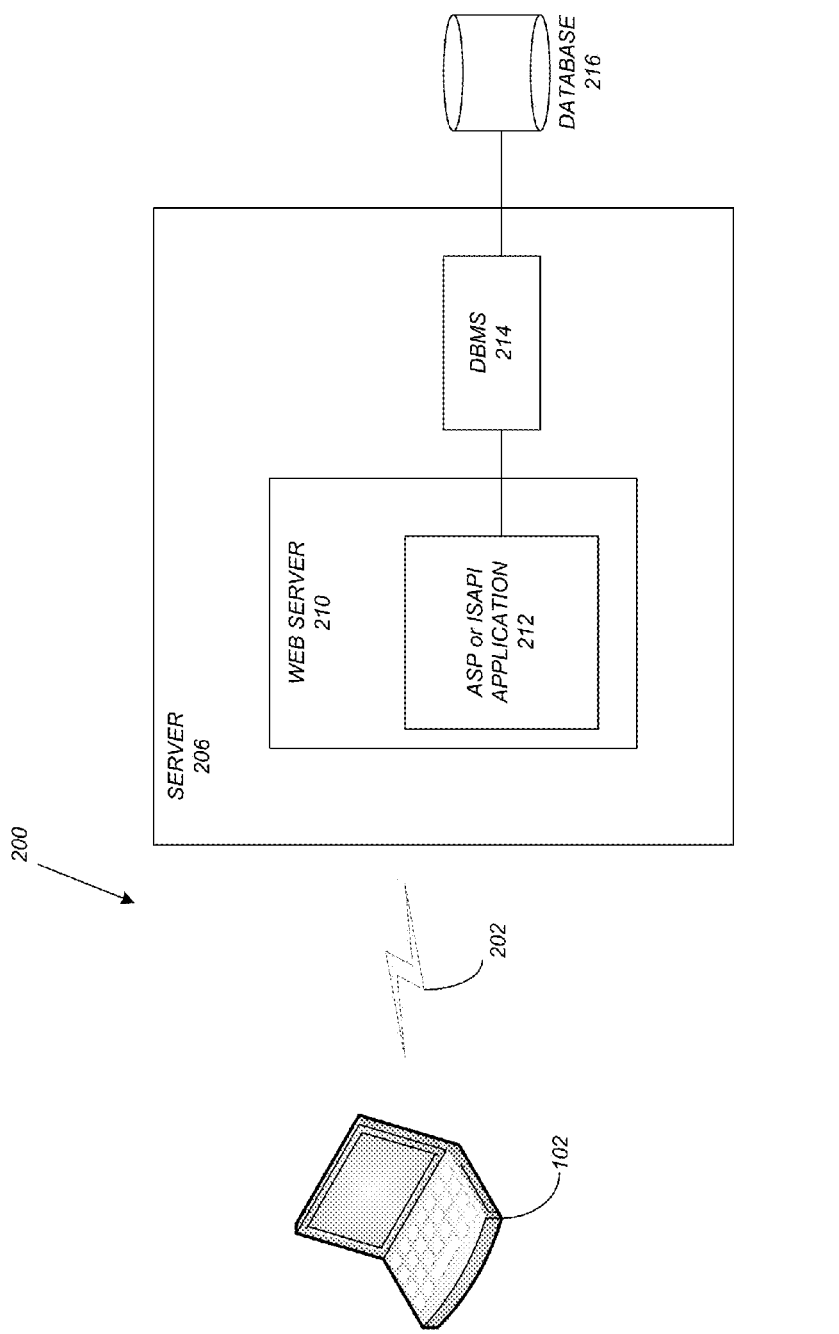
FIG. 2 schematically illustrates a typical distributed computer system used in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 102 and servers 206 in accordance with embodiments of the invention.

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 102 may be downloaded from server computer 206 to client computers 102 and installed as a plug-in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™ Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 102 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 102 and 206.

Embodiments of the invention are implemented as a software application on a client 102 or server computer 206. Further, as described above, the client 102 or server computer 206 may comprise a thin client device or a portable device that has a multi-touch-based and/or 3D enabled display capability.

Configurable Viewcube Controller

It is very useful for a designer or rendering artist to easily determine various parameters related to the model or scene the designer/artist is working on. To provide such capability, embodiments of the invention propose that the look of the viewcube controller can be configured with different statistics as per the requirements/desires of the user. Thus, the viewcube controller can be configured to display statistics for different features such as scene complexity, possible rendering time, number of vertices in the model or scene, etc.

Figure 3:
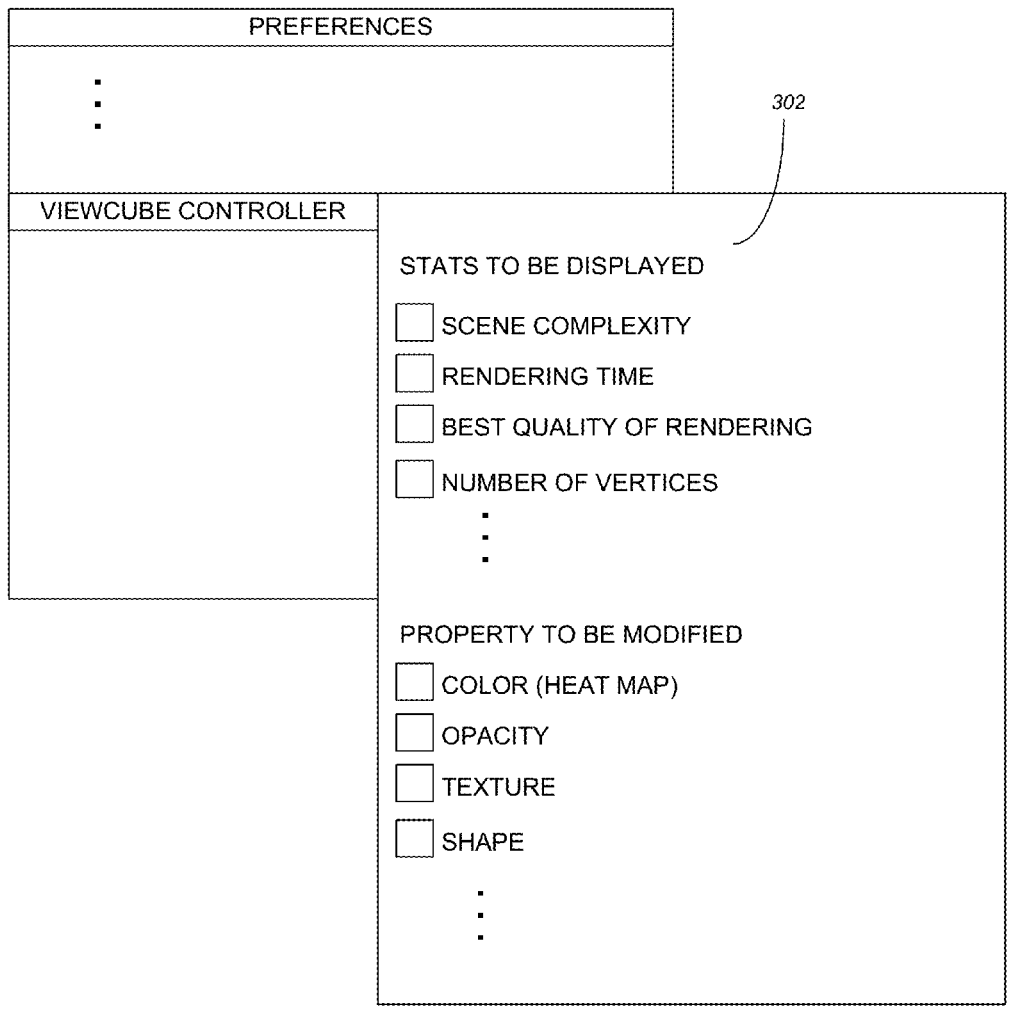
FIG. 3 illustrates how a viewcube controller can be configured to show different statistics in different ways in accordance with one or more embodiments of the invention.

FIG. 3 illustrates how the viewcube controller can be configured to show different statistics in different ways by altering the look of the viewcube controller. Options 302 for configuring the viewcube controller display for a particular 3D parameter (e.g., scene complexity, fastest rendering time, best quality rendering, number of vertices, etc.) are illustrated. Options 302 may also include the property(ies) of the viewcube controller that will be modified to reflect the statistics. Such properties may include the color (e.g., heat map), opacity, texture, shape, etc.

If color is the property of the viewcube controller that is modified based on the statistics, the viewcube controller may be assigned color(s) corresponding to the best and worst values, with colors defined for intermediate values. For example, if the option is set to fastest rendering time, the viewcube controller can be colored in green, yellow and red (similar to a heat map) showing that the camera angles with the fastest rendering time will be colored green, the camera angles with medium rendering time will be colored yellow, and the camera angles with the slowest rendering time with be colored red. Other intermediate colors can also be defined, depending on the precision required by the user. For example, a viewcube controller camera angle with 40% of fastest rendering time could be colored between red and yellow. When the viewcube controller is colored this way, the user can then rotate the viewcube controller to see which angles provide the fastest rendering time, and which ones provide the slower rendering time.

Figure 4:
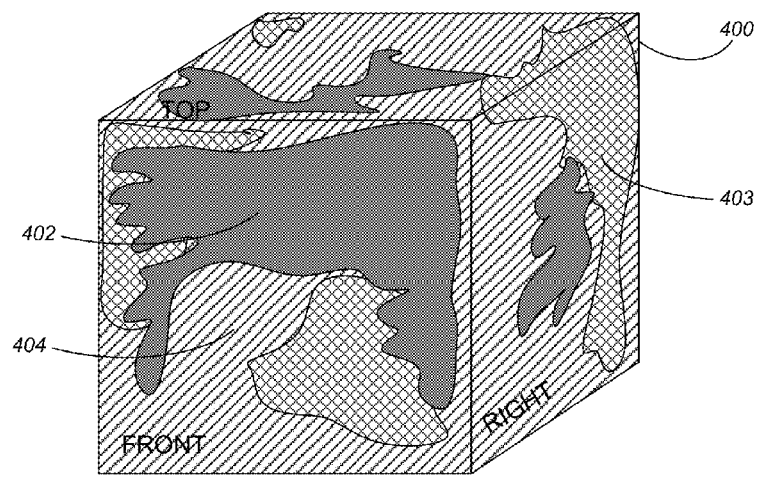
FIG. 4 illustrates an example of coloring/shading a view cube controller to reflect a property such as rendering time in accordance with one or more embodiments of the invention.

FIG. 4 illustrates an example of such a coloring. The different shades in FIG. 4 represent different colors that may be displayed using a color (heat map) in accordance with embodiments of the invention. The different colors/shades represent different properties. For example, red/darker shading 402 may represent more rendering time while green/lighter shading 404 may represent less rendering time when the scene is viewed from that angle. Rendering time in between may be shaded yellow 403.

Further, if the user is interested in rendering the scene in the shortest possible time, the user can lock the camera angle for the scene based on input from viewcube controller 400. In this regard, in the preferences 302 for the viewcube controller 400, there could be an option for automatically changing the camera angle for every frame to automatically adjust to the option set.

Figure 5:
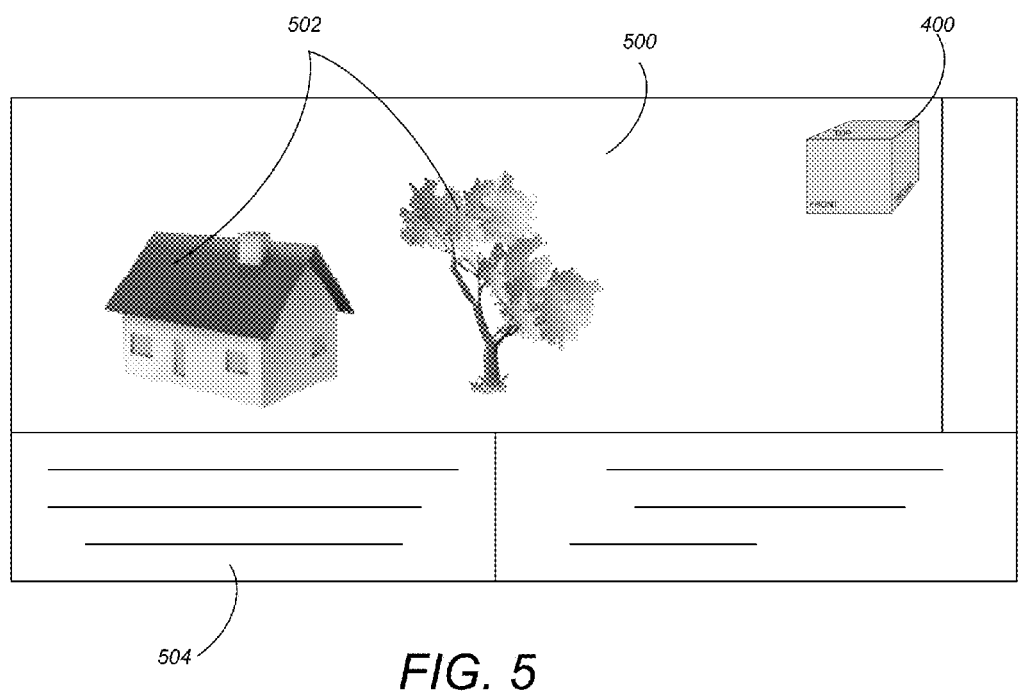
FIG. 5 shows a sample scene with the viewcube controller in accordance with one or more embodiments of the invention.

FIG. 5 shows a sample scene with the viewcube controller 400 in accordance with one or more embodiments of the invention. As illustrated, 3D models or a 3D scene 502 are shown in viewport 500. Tools 504 for modeling animation, etc. may also be displayed (e.g., below or adjacent to viewport 500). The viewcube controller 400 may change its properties based on the contents of the viewport 500. Such properties may change dynamically in real time as the model in viewport 500 changes.

Another embodiment of the invention is that the settings on the viewcube controller could be a combination of different parameters such as rendering time, rendering quality, scene complexity, etc. These parameters can be combined in different manners in the viewcube controller 400. For example, the viewcube controller 400 can display both a color map (that shows the rendering time) and another property (say opacity or texture for rendering quality). This way the user can see two (or more than two) scene properties at the same time.

Another feature of this viewcube controller 400 could be that the appearance of the controller 400 could keep changing as the scene is updated. Thus, as the user keeps modifying the scene or model 502, the appearance of the controller 400 is continuously updated in synchronization (i.e., dynamically in real time) with the changes that are happening on-screen.

In view of the above, embodiments of the invention overcome the problems of the prior art. More specifically, in the prior art, the values provided in the viewport were in the form of written text or presented as a dynamic graph on the viewport or profiler panel. In contrast, embodiments of the invention present a novel approach of viewing different parameters related to the scene. Additional useful functionalities are provided for the already existing viewcube controller 400. Most existing icons or controllers only provide a single piece of information. However, embodiments of the present invention make it possible for the user to see multiple pieces and types of information related to the scene as the user is working on the scene without opening up any additional panels.

Logical Flow

Figure 6:
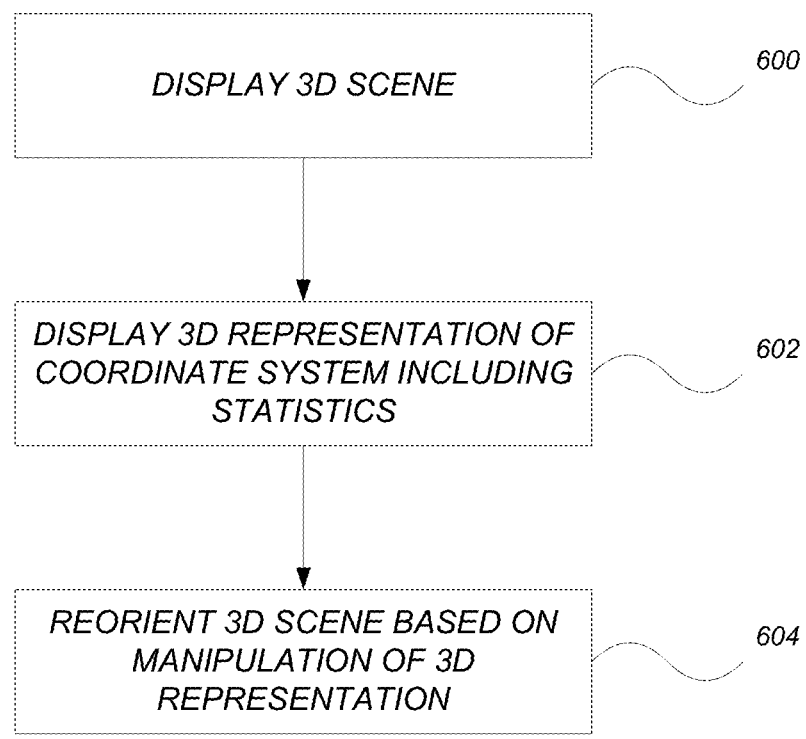
FIG. 6 illustrates the logical flow for displaying representative properties of a three-dimensional scene view.

FIG. 6 illustrates the logical flow for displaying representative properties of a three-dimensional scene view.

At step 600, a three-dimensional (3D) scene having one or more three-dimensional objects is displayed.

At step 602, a 3D representation (e.g., a cube) of a coordinate system of the 3D scene is displayed. Such a 3D representation has different faces that represent and correspond to different viewpoints of the 3D scene. Different statistics for features (and or combinations of features) of the 3D scene are reflected on the different faces of the 3D representation (based on the viewpoint corresponding to each face). The statistics may reflect/consist of estimated rendering times (e.g., of the 3D scene from the viewpoints corresponding to the different faces), estimated quality of rendering (e.g., of the 3D scene from the viewpoints corresponding to the different faces), a number of visible vertices (in the 3D scene from the viewpoints corresponding to the different faces), etc.

Step 602 may further include displaying a graphical user interface comprising selectable options for the features, selecting one or more of the options, and modifying the statistics displayed on the different faces based on the selected options.

The statistics that are displayed on the faces of the 3D representation may consist of/be based on colors. For example, the colors displayed on the different faces may be based on a heat map with a first color (e.g., red) corresponding to a first statistic, a second color (e.g., green) corresponding to a second statistic, and a third color (e.g., yellow) corresponding to a third intermediate statistic.

Manipulation of the 3D representation identifies and selects a different viewpoint of the 3D scene.

At step 604, the 3D scene is reoriented (e.g., dynamically in real time) based on the different viewpoint identified and selected from the manipulation (of the 3D representation). In addition, as modifications to the 3D scene are performed, the 3D representation may be dynamically updated in real-time to reflect such changes (e.g., if new objects are added thereby increasing the estimated rendering time, the 3D representation may be updated to reflect the increase.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for displaying representative properties of a three-dimensional scene view, comprising:
   (a) displaying, using a computer, a three-dimensional (3D) scene having one or more three-dimensional objects;
   (b) displaying, using the computer, a 3D representation of a coordinate system of the 3D scene, wherein:
      (i) different faces of the 3D representation represent and correspond to different viewpoints of the 3D scene;
      (ii) different statistics for one or more features of the 3D scene are reflected on the different faces of the 3D representation based on the viewpoint corresponding to each face; and
      (iii) manipulation of the 3D representation identifies and selects a different viewpoint of the 3D scene; and
   (c) reorienting the 3D scene based on the different viewpoint identified and selected from the manipulation; and
   (d) displaying a graphical user interface comprising selectable options for the one or more features; selecting one or more of the selectable options; and modifying the statistics displayed on the different faces based on the selected selectable options.

2. The method of claim 1, wherein the 3D representation comprises a cube.

3. The method of claim 1, wherein the statistics comprise estimated rendering times of the 3D scene from the viewpoints corresponding to the different faces.

4. The method of claim 1, wherein the statistics comprise an estimated quality of rendering of the 3D scene from the viewpoints corresponding to the different faces.

5. The method of claim 1, wherein the statistics comprise a number of visible vertices in the 3D scene from the viewpoints corresponding to the different faces.

6. The method of claim 1, wherein the statistics comprise a combination of two or more of the features.

7. The method of claim 1, wherein the different statistics are reflected on the different faces based on colors.

8. The method of claim 7, wherein:
the colors displayed on the different faces are based on a heat map;
a first color corresponds to a first statistic;
a second color corresponds to a second statistic; and
a third color corresponds to a third intermediate statistic.

9. The method of claim 1, wherein the reorienting is performed dynamically in real time as the 3D representation is manipulated.

10. The method of claim 1, wherein the 3D representation is dynamically updated in real-time as modifications to the 3D scene are performed.

11. An apparatus for displaying representative properties of a three-dimensional scene view in a computer system comprising:
(a) a computer having a memory;
(b) an application executing on the computer, wherein the application is configured to:
 (i) display a three-dimensional (3D) scene having one or more three-dimensional objects;
 (ii) display a 3D representation of a coordinate system of the 3D scene, wherein:
  (1) different faces of the 3D representation represent and correspond to different viewpoints of the 3D scene;
  (2) different statistics for one or more features of the 3D scene are reflected on the different faces of the 3D representation based on the viewpoint corresponding to each face; and
  (3) manipulation of the 3D representation identifies and selects a different viewpoint of the 3D scene; and
 (iii) reorient the 3D scene based on the different viewpoint identified and selected from the manipulation; and
display a graphical user interface comprising selectable options for the one or more features; select one or more of the selectable options; and modify the statistics displayed on the different faces based on the selected selectable options.

12. The apparatus of claim 11, wherein the 3D representation comprises a cube.

13. The apparatus of claim 11, wherein the statistics comprise estimated rendering times of the 3D scene from the viewpoints corresponding to the different faces.

14. The apparatus of claim 12, wherein the statistics comprise an estimated quality of rendering of the 3D scene from the viewpoints corresponding to the different faces.

15. The apparatus of claim 11, wherein the statistics comprise a number of visible vertices in the 3D scene from the viewpoints corresponding to the different faces.

16. The apparatus of claim 11, wherein the statistics comprise a combination of two or more of the features.

17. The apparatus of claim 11, wherein the different statistics are reflected on the different faces based on colors.

18. The apparatus of claim 17, wherein:
the colors displayed on the different faces are based on a heat map;
a first color corresponds to a first statistic;
a second color corresponds to a second statistic; and
a third color corresponds to a third intermediate statistic.

19. The apparatus of claim 11, wherein the application is configured to reorient dynamically in real time as the 3D representation is manipulated.

20. The apparatus of claim 11, wherein the 3D representation is dynamically updated in real-time as modifications to the 3D scene are performed.

* * * * *

UNITED STATES PATENT AND TRADEMARK OFFICE
CERTIFICATE OF CORRECTION

PATENT NO. : 9,043,707 B2
APPLICATION NO. : 13/910808
DATED : May 26, 2015
INVENTOR(S) : Gunjan Porwal Page 1 of 1

It is certified that error appears in the above-identified patent and that said Letters Patent is hereby corrected as shown below:

In the claims

Column 10

Lines 11-13, delete the text, "The apparatus of claim 12, wherein the statistics comprise an estimated quality of rendering of the 3D scene from the viewpoints corresponding to the different faces."

and insert the text, --The apparatus of claim 11, wherein the statistics comprise an estimated quality of rendering of the 3D scene from the viewpoints corresponding to the different faces.--

Signed and Sealed this
Ninth Day of August, 2016

Michelle K. Lee
*Director of the United States Patent and Trademark Office*